J. A. MAHR.
BABY CARRYING BASKET.
APPLICATION FILED MAY 21, 1919.
1,363,667.
Patented Dec. 28, 1920.
2 SHEETS—SHEET 1.
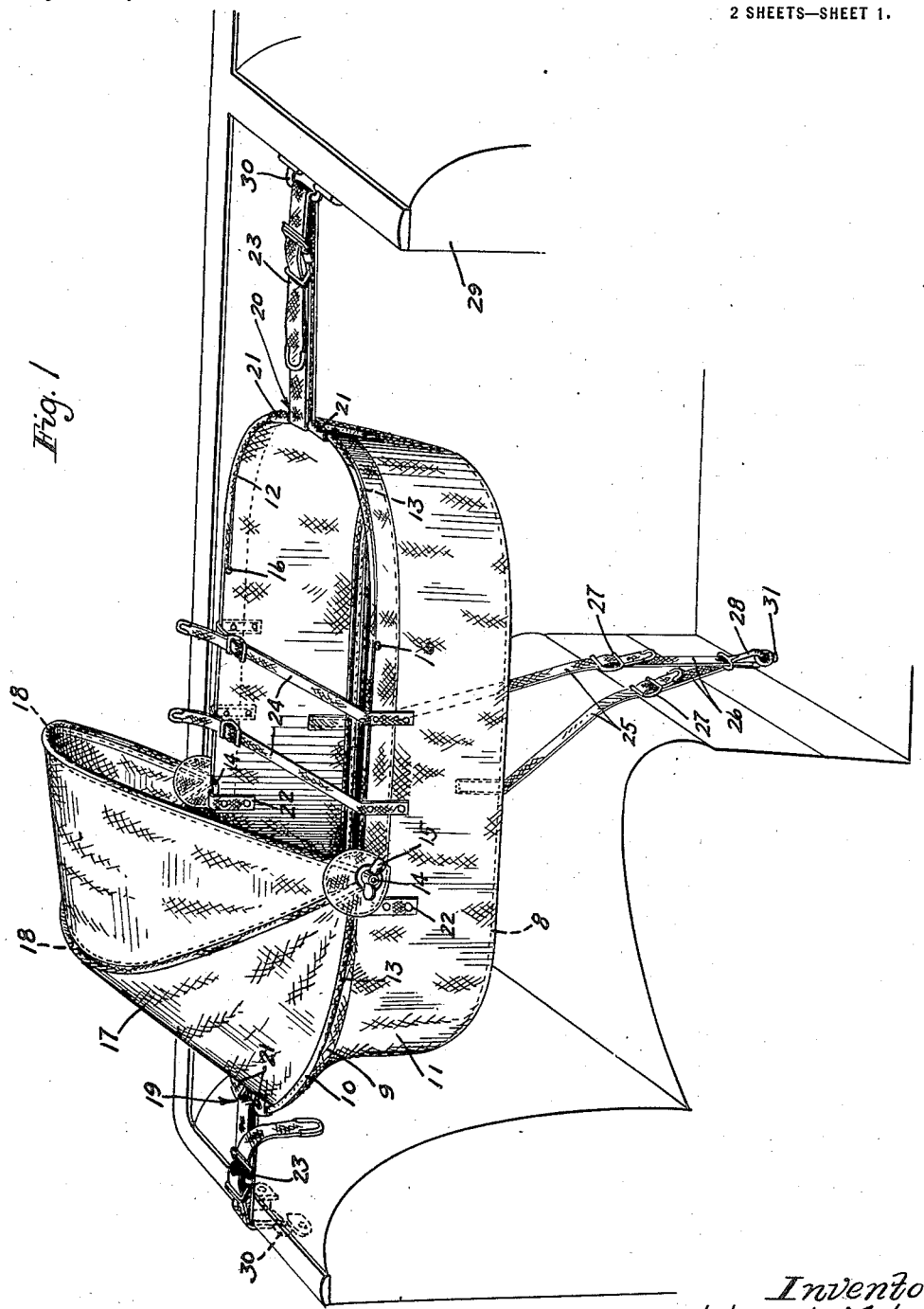
Inventor
Julius A. Mahr
By his Attorneys

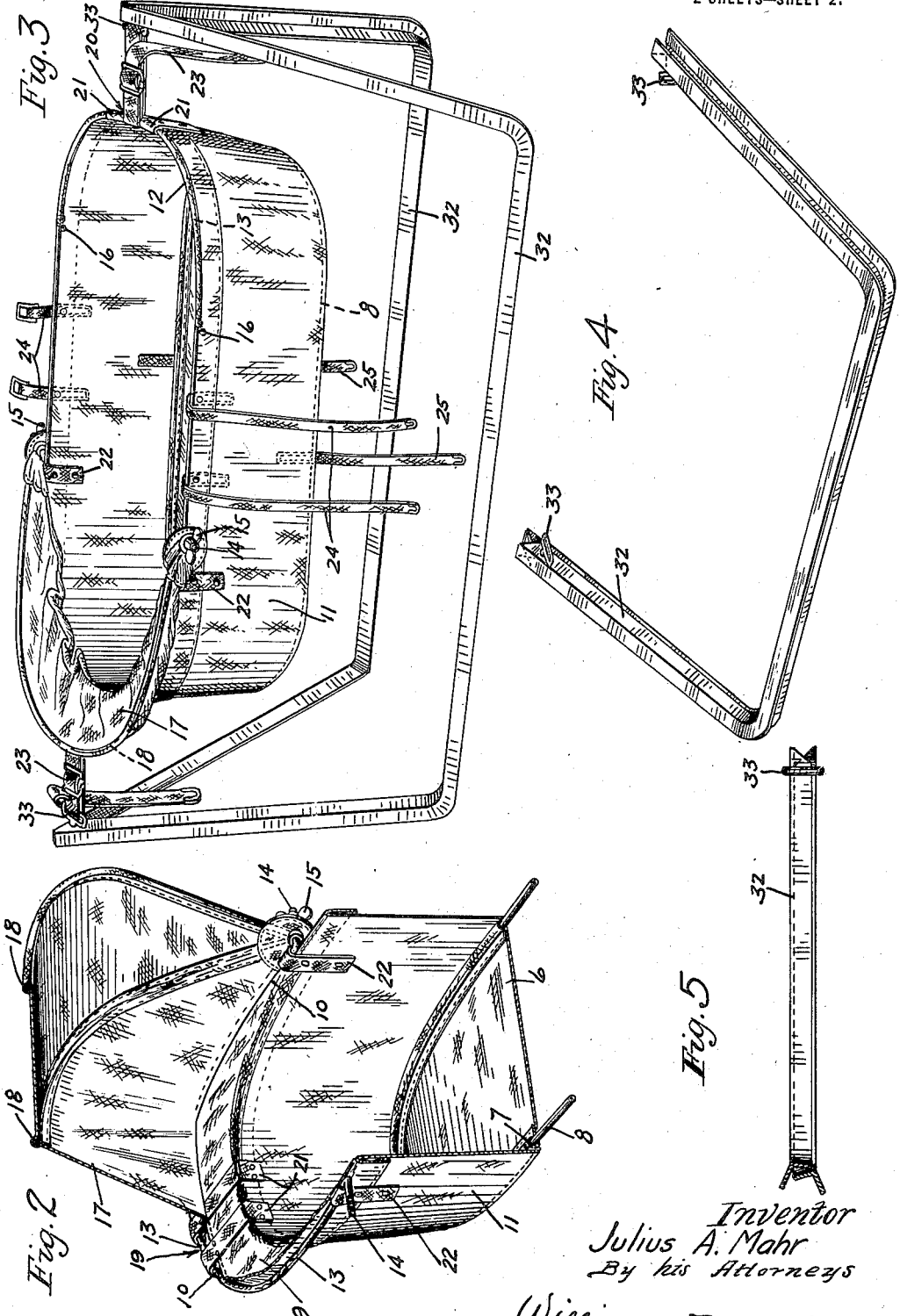

UNITED STATES PATENT OFFICE.

JULIUS A. MAHR, OF MINNEAPOLIS, MINNESOTA.

BABY-CARRYING BASKET.

1,363,667.  Specification of Letters Patent.  Patented Dec. 28, 1920.

Application filed May 21, 1919. Serial No. 298,718.

*To all whom it may concern:*

Be it known that I, JULIUS A. MAHR, a citizen of the United States, residing at Minneapolis, in the county of Hennepin and State of Minnesota, have invented certain new and useful Improvements in Baby-Carrying Baskets; and I do hereby declare the following to be a full, clear, and exact description of the invention, such as will enable others skilled in the art to which it appertains to make and use the same.

My invention has for its object to provide a baby-carrying basket intended for general use, but especially adapted as an attachment for automobiles.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a perspective view of the invention secured in an automobile diagrammatically illustrated;

Fig. 2 is a perspective view of the invention partly in section and with some parts broken away;

Fig. 3 is a perspective view of the invention secured to a supporting rack;

Fig. 4 is a perspective view of the supporting rack folded; and

Fig. 5 is a view of the supporting rack in transverse section and folded.

The baby-carrying basket is collapsible and preferably made from canvas, drilling or other suitable fabric. At the marginal edge of the bottom 6 of the basket, is a hem 7 in which is placed a spreader rim 8, as shown in the form of an endless metal rod, which is round in cross section and bent into the form of an oval to follow the contour of said marginal edge. Secured to the head end of the basket, at the upper edge of the sides thereof, is an inclined extension 9 having in its outer edge a hem 10. In the upper edge of the sides 11 of the basket, at the foot end thereof, is a hem 12.

Placed in each hem 10 and 12, is a U-shaped spreader rim section 13. These rim sections 13 are also made from metal rods, the ends of which terminate a considerable distance apart, thus leaving the upper intermediate edge portions of the sides 11 between the ends of said rim sections collapsible. The ends of the head end rim section 13 are bent laterally outward to afford a pair of alined trunnions 14 that are screw-threaded and have mounted thereon thumb nuts 15. The trunnions 14 extend outward through the hem 10 and hold the respective spreader rim section 13 against endwise movement in said hem and rivets 16, passed through the hem 12, hold the foot end spreader rim section 13 against endwise movement in said rim 12.

The lower edge of a hood 17 is attached to the hem 10 of the extension 9 and which hood is provided with two bows 18 for giving said hood the desired shape. These bows 18 are connected at their ends and pivoted to the trunnions 14 for opening movement over the head end of the basket, as shown in Figs. 1 and 2, and for closing movement onto the extension 9, as shown in Fig. 3. Preferably, the extension 9 and hood 17 are made from the same kind of material as the balance of the basket. A gap 19 is formed in the hem 10 and a gap 20 is formed in the hem 12 to expose portions of the spreader rim sections 13, at the head and foot ends of the basket. Reinforcing straps 21 straddle the hems 10 and 12, at the ends of the gaps 19 and 20, and the end portions thereof are riveted to the sides of the basket and the extension 9. Straps 22, similar to the straps 21, straddle the hem 10 at the trunnions 14 and their end portions are riveted to the sides of the basket.

Buckle-equipped hanger straps 23 are passed around the spreader rim sections 13 through the gaps 19 and 20, for supporting the basket, as will presently appear. Two buckle-equipped retaining straps 24, the sections of which are secured to the sides of the basket, between the ends of the spreader rim section 13, are provided for holding a baby in the basket and also for holding the covers in position. By attaching the straps 24 to the collapsible upper edges of the sides of the basket, said sides may be snugly drawn around the baby. Two anchor strap sections 25 are secured, one to each side of the basket, at points substantially half way between the ends of said basket and extend below the bottom 6. A third anchor strap section 26, having at each end a buckle 27, connects the lower ends of the straps 25 and a snap 28 is secured to the intermediate portion of said strap section 26. The straps 23, 24, 25 and 26 are made from webbing or other suitable material.

In Fig. 1, the baby-carrying basket is shown as an attachment for an automobile 29 and is hung by securing loop-like brackets 30 to the backs of the front and back seats and extending the straps 23 therethrough. The hanger straps 23 adjustably support the baby-carrying basket over and above the back seat, preferably at one side thereof, so that a person may sit on the seat next to the basket.

The required spring action for the baby-carrying basket is imparted thereto, through the hanger straps 23 and the basket itself, and to hold said basket against extreme vertical movement, a screw-eye 31 is secured in the floor of the automobile close to the back seat, so as to be out of the way, and the snap 28 secured thereto, as shown in Fig. 1. A baby carried in the basket, when used as an attachment for an automobile, is, of course, much more comfortable than when carried in the arms or on the lap of a person, and also making it much more comfortable for the mother or other attendant. By releasing the snap 28 from the screw-eye 31 and separating the straps 23 from the brackets 30, the basket may be carried from the automobile without disturbing the baby.

To support the baby-carrying basket in a room, on a porch, or out-of-doors, there is provided a folding rack 32 comprising a pair of U-shaped members, the ends of which are connected by pivots 33 having loops to receive the hanger straps 23, as shown in Fig. 3. As shown, each member of the rack 32 is formed from a single piece of angle bar and said members are of such size as to fold, one within the other, as shown in Figs. 4 and 5. When not in use, the rack 32 may be folded and carried in an automobile or stored in a convenient place.

The above described baby-carrying basket has, in actual usage, proven highly efficient for the purpose had in view. The basket may also be placed directly on the ground or suspended as a hammock from any suitable means. The hood 19 may be adjusted to protect the baby in the basket from the wind and sun.

What I claim is:—

1. A collapsible baby-carrying basket having a bottom spreading rim, independent U-shaped spreader rim sections in the end of the basket at the upper edge thereof, said sections being longitudinally separated the one from the other, and hanger straps attached to said rim sections.

2. A collapsible baby-carrying basket having a bottom spreading rim, independent U-shaped spreader rim sections in the ends of the basket at the upper edge thereof, said sections being longitudinally spaced the one from the other, a buckle-equipped strap connecting the sides of the basket between the longitudinally spaced U-shaped rim sections, and a hanger strap attached to said rim sections.

3. A collapsible baby-carrying basket having in its head end a U-shaped spreader rim, the ends of which are bent to afford trunnions, and a collapsible hood having bows foldably connected and attached to said trunnions.

In testimony whereof I affix my signature in presence of two witnesses.

JULIUS A. MAHR.

Witnesses:
CLARA DEMAREST,
HARRY D. KILGORE.